Patented July 30, 1935

2,009,437

UNITED STATES PATENT OFFICE 2,009,437

NONCAKING PIGMENT

Cole Coolidge and Harold S. Holt, Wilmington, Del., assignors to E. I. du Pont de Nemours & Company, Wilmington, Del., a corporation of Delaware No Drawing. Application May 24, 1932, Serial No. 613,263

4 Claims. (Cl. 134—58)

This invention relates to non-caking pigments and non-caking pigmented coating compositions and, more particularly, to a method of providing a protective film on individual pigment particles in order to prevent caking of the pigment in various coating compositions. The present application is a continuation in part of applicants' copending application Serial No. 278,909, filed May 18, 1928, which has resulted in U. S. Patent No. 1,863,834, "Non-caking pigmented coating compositions and process of making same."

It is desirable first to comment briefly upon the behavior of certain pigments in prior art coating compositions in regard to the phenomenon known as "caking". As pigmented coating compositions have been ordinarily prepared, the pigments have been distributed or dispersed in the coating compositions by various means to a degree satisfactory from a practical standpoint as far as the immediate condition of the composition is concerned. However, after standing for a period of time, such compositions have exhibited a tendency for the sedimentation of the pigment, this process or phenomenon developing eventually to the point where the pigment becomes massed and tough with the ageing of the composition, so that finally a hardness and dryness of the settled pigment takes place, which makes it very difficult to reincorporate the pigment in the composition to the same degree of dispersion existing originally. In some cases the cake so formed can be redispersed to a degree where the composition can be used, but this operation requires expenditure of energy and time, and, as a rule, it is difficult to obtain the original degree of dispersion without resorting to regrinding.

Experience has shown that frequently a comparatively large percentage of the pigment could not readily be redispersed owing to an insufficient degree of stirring, with a resulting quality unsatisfactory to the consumer. An inferior quality resulted because the covering power was decreased, lumpy particles were present in the film, and off-tints in the case of light colors were encountered. Such a condition existing in paint products represented definitely undesirable qualities while in low viscosity products, such as brushing enamels, it has constituted a serious and objectionable feature. The tendency for the formation of a hard cake in the manner set forth varies with the pigment and also with the vehicle. It has been found that in certain instances it is possible to select for a given vehicle certain pigments which do not hard-cake to an extreme degree in the normal life of a shelf product, but this is not always a matter of free choice, as it is often necessary to use pigments with definite hard-caking tendencies in order to obtain certain necessary or desirable characteristics in the final products. Such a case may be illustrated by the more highly pigmented enamels, such as white and light shades, the latter representing tinted white in most cases. The combination of high density pigment, or a pigment of an abnormal hard-caking tendency, with a low viscosity vehicle, represents a system which frequently develops a maximum in hard-caking, this objectionable property being produced to a degree which is worse than in most enamel and paint products of the prior art. The importance of hiding power, the highly uniform surface character, and the necessity for close matches in tint render the off-quality characteristics imparted by hard-caking particularly serious in the case of enamel type products.

On the other hand, some paint, enamel, and lacquer compositions do not develop hard-caking owing to the peculiar nature of the systems involved, but nevertheless this hard-caking phenomenon has been frequently experienced in many kinds of prior art formulations for paints, lacquers, enamels, et cetera.

It will be clear from this discussion that we are not discussing a mere sedimentation or temporary deposition of pigment particles that can be easily remedied by stirring, but we are rather referring to a result of deposition or settling of particles which results in the formation of a hard cake that is most difficult to reincorporate with the vehicle and which, generally speaking, exhibits the characteristics of toughness, hardness, and resistance to stirring and reincorporation in the vehicle.

An object of the present invention is to provide a process of preparing non-caking pigmented coating compositions whereby the difficulties discussed above may be eliminated. A further object is to provide a non-caking pigment which may be incorporated in various vehicles by standard methods to give a non-caking composition. A further object of the invention is to provide a simple and economical method of treating pigments to give them non-caking properties. A more specific object is to provide a non-caking titanium oxide pigment. Other objects will be apparent from the description of the invention given hereinafter.

The above objects are accomplished according to the present invention by depositing a film of the acid sulfonation product of an oil as a protective agent on the individual particles of the pigment mass. The protective agent may be deposited on the pigment particles before incorporating in the vehicle whereby, upon drying, a substantially dry, non-caking pigment mass may be obtained suitable for incorporation in any vehicle by standard methods, or the protective agent may be deposited on the pigment particles while making up the coating composition.

The following examples are given to illustrate preferred specific embodiments of the invention, parts being given by weight:

*Example 1.*—This example relates to the treatment of a composite titanium oxide pigment with a protective agent in a water slurry. The composite titanium oxide pigment was a well known commercial mixture of titanium oxide and barium or calcium sulphate.

One thousand parts of the composite titanium oxide pigment are treated with water to produce a 1:2 slurry of pigment to water and 100 parts of a 10% by weight aqueous solution of the acid sulfonation product of petroleum are added slowly to the slurry (equivalent to 1% of the protective agent based on the weight of the pigment). After vigorous agitation for 30 minutes, the water is evaporated and the sludge dried at 105° C. for 18 hours. The dry cake of treated pigment is ground on a disintegrator and is then ready for use in formulating coating compositions. Less water may be used providing a suitable mixing device is used to handle the resulting heavy sludge.

If desired the slurry may be filtered and the filter cake dried and disintegrated, after which it is ready for use. By this procedure some of the agent is sometimes lost through filtration and an experimentally determined excess of agent must then be added, such that the desired quantity of agent remains on the pigment.

It is to be noted in this connection that various types of sulfonation products of petroleum and other oils are available, some of which are water soluble and others of which have only a limited solubility in water or are practically insoluble. For that reason, the amount of water required to dissolve the agent may vary considerably. Furthermore, for water insoluble sulfonation products, volatile organic solvents may be used as illustrated by Example 2.

*Example 2.*—Titanium oxide pigment is mixed with a naphtha solution or dispersion of a sulfonation product of castor oil to produce a uniform paste containing:

| | |
|---|---|
| Naphtha | 10.50 |
| Sulfonation product of castor oil | .55 |
| Titanium oxide | 55.00 |

This paste is thoroughly mixed in any suitable mixing device until a smooth uniform paste is obtained. The paste is then dried and disintegrated, after which it is ready for use in the normal manner in preparing coating compositions. The solvent may be evaporated under vacuum, with or without heating, and recovered and again be used.

The amount of solvent which is to be used is determined by the characteristics of the pigment to be treated and the amount may vary considerably. As solvents a wide variety of volatile, organic liquids may be used, such as mineral spirits, gasoline, naphtha, benzol, toluol, et cetera. The solubility of the agent in the solvent will be a factor in determining which solvent to select.

If it is desired, the wet paste may be used directly in preparing coating compositions in which case the solvent chosen is thus used as the thinner constituent in the coating composition.

As a modification of either Example 1 or 2, the acid sulfonation product or its solution in a suitable solvent (immiscible with water) may also be emulsified by suitable emulsifying or stabilizing agents and added as an emulsion to a water slurry of the pigment which may then be filtered, dried and disintegrated, after which it is ready for use. It may be desirable to break the emulsion in the presence of the pigment slurry by known means, such as adding a suitable salt or an acid, or by heating the slurry, thus depositing the protective agent on the pigment.

We have found in general that pigments prepared as described above represent a marked improvement over untreated pigments because of reduced tendency to hard cake. This improvement is, of course, most marked in pigments and vehicle systems which are inherently severe in their caking tendencies.

*Example 3.*—This example illustrates the treatment of a gloss exterior paint. Twenty parts by weight of boiled drying oil, comprising 85% linseed oil, 14.7% Chinawood oil, and .3% drier, mineral spirits, 10 parts by weight; the acid product obtained by sulfonation of tallow, .2 part by weight, making a total of 30.2 parts are taken. The pigment consisting of 40 parts composite titanium oxide pigment is then slowly added, with thorough mixing, until all has been uniformly incorporated. It is then ground and thereafter the base is reduced with drying oil, 20 parts; mineral spirits, 10 parts.

Other acid sulfonation products may be applied and used in the manner described above.

We have found that by using the sulfonation product of tallow in paints as described above, a large improvement in caking resistance is obtained. A paint prepared as described above but without the agent was entirely unsatisfactory. Even after only a short period of storage (less than a month), the pigment had settled to a very hard dry mass which could only be broken up with great difficulty and could not be satisfactorily redispersed by stirring. The pigment in the treated sample had, on the other hand, settled to a very soft layer which could readily be dispersed in the vehicle by simple stirring with a spatula.

*Example 4.*—This example illustrates the treatment of a modified polyhydric alcohol-polybasic acid type resin paint. In this case the total pigment is mixed with a portion of the vehicle and thinner containing all the protective agent required to give the desired percentage of agent on the basis of the pigment. The following constituents are mixed and constitute the mill base:

| | Parts |
|---|---|
| Composite titanium oxide pigment | 200 |
| Modified polyhydric alcohol-polybasic acid resin solution (70% in mineral spirits) | 28.6 |
| Mineral spirits | 20.0 |
| Solution of the acid sulfonation product of petroleum (10% in mineral spirits) | 20.0 |

This paste is ground in a pebble mill or other suitable grinding device, after which the finished product is prepared by mixing into the base the following constituents:

114.3 parts of the resin solution described above
7.1 parts of a drier solution (cobalt linoleate in mineral spirits)
46.0 parts of mineral spirits.

The amount of mineral spirits to be added is governed by the consistency which is desired for the finished product.

The above example illustrates a polyhydric alcohol-polybasic acid coating composition in which an acid sulfonation product of an oil is used. Pigments prepared by treatments given in any of the above examples may be used in formulating products similar to Example 4, but omitting the addition of the protective agent, since it is already incorporated on the pigment.

By the use of an agent such as described above, a marked improvement is noted in the ease with which the pigments can be redispersed in the vehicle after the paint has been stored and the pigment has settled. The untreated pigment settled to a hard, tough mass which was difficult to redisperse in the paint vehicle. The pigment in the paint which had been treated as described above settled to a soft mass which was readily redispersed. Comparative tests were made on paints made with and without treatment, prepared at the same time, in the same manner and stored under the same conditions.

The present invention includes within its scope not only the acid sulfonation products disclosed in the specific examples, but the acid sulfonation products of oils in general. Among other suitable protective agents may be mentioned the acid sulfonation products of cod oil, corn oil, red oil, (sulfonated oleic acid), olive oil, cotton seed oil, hydrogenated oils, lard, tallow, petroleum, lubricating oils, and other semi-drying and drying oils. The term "drying oil" is used herein to include both drying and semi-drying oils as distinguished from non-drying oils, and the term "acid sulfonation product of an oil" as used herein is meant to include not only such products which have not been neutralized to any extent, but also such products which have been neutralized up to about 25%. As suitable neutralizing agents may be mentioned the alkalies, alkaline earths, ammonia, and organic bases, such as amines. Products neutralized only to 25% are, of course, distinctly acid and retain the favorable properties of acid products desirable in the present invention. In many cases, however, it is desirable to neutralize only 5-10% of the acidity to obtain the desired regulation of the caking tendencies of the pigment.

The invention is applicable to pigments in general, but is especially effective in treating pigments having a specific gravity above 2.5, since such pigments have a strong tendency to hard-cake. Pigments of this type include lithopone, lakes, white lead, zinc oxide, iron oxide, chrome yellows and greens, Prussian blue, and, especially titanium oxide pigments. The titanium oxide pigments have a most pronounced tendency to hard-cake. The term "titanium oxide pigment" as used herein is intended to include pigments containing titanium oxide whether alone, in physical admixture with other pigments, or in chemical combination.

The protective agent is preferable used in amounts equal to .25% to 1.0%, based on the weight of pigment, although amounts up to 2.0% and, in the event that a coating composition is to be stored at very low viscosity for a long period, amounts of protective agent as high as 5.0%, or in rare cases, 10.0%, may be desirable.

In the foregoing examples, we have illustrated various methods and formulas as the result of which the pigment is incorporated in the vehicle or composition in such a manner that hard-caking is prevented, and thereby the aforesaid objects of the invention have been attained. As may be ascertained from the examples, this hard-caking is prevented by employing sulfonation products of oils in one form or another in such a manner as to deposit a coating of protective agent upon the pigment particles, so that the pigment will be put in a condition where it will not cake together to form a hard, tough mass that would resist an attempt to stir it or disperse it again into the vehicle, but it is rather in such a condition that, even though it might be inclined to deposit sediment, it would not form a hard cake, but could be readily reincorporated in the vehicle or composition by a reasonable amount of stirring, or suitable agitation.

As shown by the foregoing examples, pigments may be treated with the herein disclosed protective agents and then dried out so as to be available for incorporation in various coating compositions according to standard practices, or the protective agent may be deposited on the pigment particles during the preparation of the coating composition.

The protective agents herein disclosed are to be distinguished from neutralized sulfonation products of oils, such as sodium petroleum sulfonate and various so-called "soaps", which are substantially neutral products. Although such products show a slight tendency to prevent hard-caking of pigments, they are not to be compared in efficacy with the protective agents of the present invention which substantially completely eliminate hard-caking of pigments under the most drastic conditions.

As many apparently widely different embodiments of this invention may be made without departing from the spirit and scope thereof, it is to be understood that the invention is not limited to the specific embodiments thereof except as defined in the appended claims.

We claim:

1. A substantially dry mass, in finely divided form, of a titanium oxide pigment having a specific gravity greater than 2.5, the individual particles of said pigment mass having a film on their surfaces of the acid sulfonation product of an oil whereby said pigment is rendered substantially non-caking in a coating composition.

2. A substantially dry mass, in finely divided form, of a titanium oxide pigment having a specific gravity greater than 2.5, the individual particles of said pigment mass having a film on their surfaces of the acid sulfonation product of a member from the group consisting of petroleum, tallow, and drying oils whereby said pigment is rendered substantially non-caking in a coating composition.

3. A substantially dry mass, in finely divided form, of a titanium oxide pigment having a specific gravity greater than 2.5, the individual particles of said pigment mass having a film on their surfaces of the acid sulfonation product of an oil, the said acid sulfonation product amounting to from 0.25-2.0%, based on the weight of the pigment mass whereby said pigment is rendered substantially non-caking in a coating composition.

4. A substantially dry mass, in finely divided form, of a titanium oxide pigment having a specific gravity greater than 2.5, the individual particles of said pigment mass having a film on their surfaces of the acid sulfonation product of a member from the group consisting of petroleum, tallow, and drying oils, the said acid sulfonation product amounting to from 0.25-2.0%, based on the weight of the pigment mass whereby said pigment is rendered substantially non-caking in a coating composition.

COLE COOLIDGE.
HAROLD S. HOLT.